United States Patent
Premrl (10) Patent No.: US 12,492,575 B2
(45) Date of Patent: Dec. 9, 2025

(54) LOCKING SYSTEM FOR AN AIRCRAFT DOOR

(71) Applicant: Pipistrel d.o.o., Ajdovščina (SI)

(72) Inventor: Miha Premrl, Vipava (SI)

(73) Assignee: Pipistrel d.o.o., Ajdovscina (SI)

( * ) Notice: Subject to any disclaimer, the term of this patent is extended or adjusted under 35 U.S.C. 154(b) by 195 days.

(21) Appl. No.: 18/480,251

(22) Filed: Oct. 3, 2023

(65) Prior Publication Data
US 2025/0109610 A1   Apr. 3, 2025

(51) Int. Cl.
| | | |
|---|---|---|
| E05B 13/00 | (2006.01) | |
| B64C 1/14 | (2006.01) | |
| E05B 77/22 | (2014.01) | |
| E05B 83/36 | (2014.01) | |
| E05B 85/12 | (2014.01) | |

(52) U.S. Cl.
CPC .......... *E05B 13/002* (2013.01); *B64C 1/1407* (2013.01); *E05B 77/22* (2013.01); *E05B 83/36* (2013.01); *E05B 85/12* (2013.01)

(58) Field of Classification Search
CPC ........ E05B 13/002; E05B 83/36; E05B 77/22; E05B 85/12; E05C 3/04; E05C 3/00; E05C 3/06; E05C 3/12; Y10T 292/1047; Y10T 292/1051; Y10T 292/1059; Y10T 292/1078; Y10T 292/108
See application file for complete search history.

(56) References Cited

U.S. PATENT DOCUMENTS

| | | | |
|---|---|---|---|
| 2,486,586 A | 11/1949 | Brittain et al. | |
| 6,059,231 A * | 5/2000 | Dessenberger, Jr. | B64C 1/1407 |
| | | | 292/336.3 |
| 10,538,304 B2 | 1/2020 | Erben | |
| 10,982,471 B2 | 4/2021 | Emrich et al. | |
| 11,572,194 B2 | 2/2023 | Kiriakos et al. | |
| 11,603,684 B2 * | 3/2023 | Savidge | B64C 1/1423 |
| 2020/0300001 A1 | 9/2020 | Chadwell | |

FOREIGN PATENT DOCUMENTS

| | | |
|---|---|---|
| EP | 3253939 B1 | 12/2017 |
| GB | 683445 A | 11/1952 |

OTHER PUBLICATIONS

Extended European Search Report dated Feb. 3, 2025, 8 pages, issued in EP application No. 24197551.5.

* cited by examiner

*Primary Examiner* — Christine M Mills
*Assistant Examiner* — Yahya Sidky
(74) *Attorney, Agent, or Firm* — Avek IP, LLC (57) ABSTRACT

A locking system for an aircraft door having a door handle housing to mount to the aircraft door; a locking mechanism supported by the door handle housing; an exterior handle and an interior handle each to manipulate the locking mechanism. The locking mechanism having a door gear axis to rotate via operation of the interior handle and the exterior handle to lock and unlock the locking mechanism; and a locking pin extending from the door gear axis and into a chamber of the door handle housing, the locking pin having a first position and a second position, the first position of the locking pin blocks rotation of the door gear axis and the second position of the locking pin allows rotation of the door gear axis. The locking pin is moveable from the first position to the second position via operation of the interior handle and the exterior handle.

18 Claims, 12 Drawing Sheets

LOCKING SYSTEM FOR AN AIRCRAFT DOOR

BACKGROUND

1. Field

Embodiments of the disclosure relate to aircraft door handles, and in particular to a locking system for an aircraft door handle that includes a locking pin to prevent the lock from becoming disengaged due to vibration of the aircraft, the locking pin being part of a locking mechanism that is independently operable from both an exterior handle and an interior handle.

2. Related Art

Aircraft door locks are known in the art and lock an aircraft door, such that the aircraft door does not open during flight. Generally, locks for aircraft doors should allow for the door to be opened from both the inside of the aircraft and the outside of the aircraft, for safety purposes. Some examples include U.S. Pat. No. 10,982,471 to Emrich et al. which describes an aircraft door latch mechanism, wherein the internal and external actuation mechanisms are independent. U.S. Pat. No. 11,572,194 to Kiriakos et al. describes an aircraft door latch mechanism with a locking pin that moves in response to movement of a solenoid. U.S. Pat. No. 10,538,304 to Erben et al. describes an aircraft door latch mechanism that employs a hooking pintle and latch to prevent the door from being accidentally opened and positive force must be used to unlock the door. U.S. Patent Application No. 2020/0300001 to Chadwell et al. describes an aircraft door latch mechanism, wherein coupling pins and retention pins are used to hold the door in a latched position. U.S. Pat. No. 11,603,684 to Savidge et al. describes an aircraft door latch mechanism, wherein the interior and exterior opening mechanisms may be independent by employing a clutch mechanism.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the disclosure relates to a locking system for an aircraft door, the locking system comprising a door handle housing configured to mount to the aircraft door; a locking mechanism supported by the door handle housing; an exterior handle configured to open the aircraft door by manipulating the locking mechanism from an exterior of the aircraft; and an interior handle configured to open the aircraft door by manipulating the locking mechanism from an interior of the aircraft. The locking mechanism having a door gear axis configured to rotate via operation of the interior handle and the exterior handle to lock and unlock the locking mechanism; and a locking pin extending from the door gear axis and into a chamber as part of the door handle housing, the locking pin having a first position and a second position. Wherein in the first position the locking pin blocks rotation of the door gear axis; and wherein in the second position the locking pin allows rotation of the door gear axis. Further, wherein the locking pin is moveable from the first position to the second position via operation of the interior handle and the exterior handle such that the interior handle and the exterior handle can independently move the locking pin into the second position to operate rotation of the door gear axis.

In other embodiments, the disclosure relates to a locking mechanism as part of an aircraft door locking system, the locking mechanism comprising a housing forming a chamber, the housing being a stationary component of the aircraft door locking mechanism; a door gear axis coupled to the housing, the door gear axis forming a rotating component of the locking mechanism; and a locking pin extending from the door gear axis and into the chamber, the locking pin having a first position and a second position. In the first position the locking pin blocks rotation of the door gear axis, and in the second position the locking pin allows rotation of the door gear axis.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft, in particular small and sports aircraft, include door latches with locking mechanisms that usually allow for opening from both the interior of the aircraft and the exterior of the aircraft, which improves safety. One conventional style of aircraft door latch includes a handle that engages with a locking mechanism through a housing, wherein the housing is mounted to an aircraft door. The locking mechanism includes a latch holder that engages with a latching device such that as the latch holder is manipulated via the handle, the latching device will lock or unlock the door. In other words, as a user rotates the handle, torque is then applied to the locking mechanism to rotate latching devices and accordingly lock or unlock the aircraft door. One potential concern with these conventional systems is that vibration applied to the latch holder may cause the latch holder to move during flight, which could lead to disengagement of the latching device and resulting in a safety concern.

The locking system for an aircraft door of the present invention provides for an improved locking mechanism by incorporating a locking pin, the locking pin configured to prevent rotation of a door gear axis responsible for manipulation of latching devices. Accordingly, the locking pin reduces the risk of unintentional unlocking of an aircraft door due to aircraft vibration. In embodiments, the locking pin extends from a stationary portion of the locking mechanism and through a rotating portion of the locking mechanism, such that the locking pin prevents rotation when engaged and allows rotation when disengaged. In embodiments, an interior door handle must be pushed into the locking mechanism to depress the locking pin to allow for rotation and opening of the door from inside of the aircraft. Alternatively, an exterior handle must be pivoted to depress the locking pin and allow rotation and for the door to be opened from outside of the aircraft. Accordingly, the aircraft locking system improves safety, particularly for small and sport aircraft.

Figure 1:
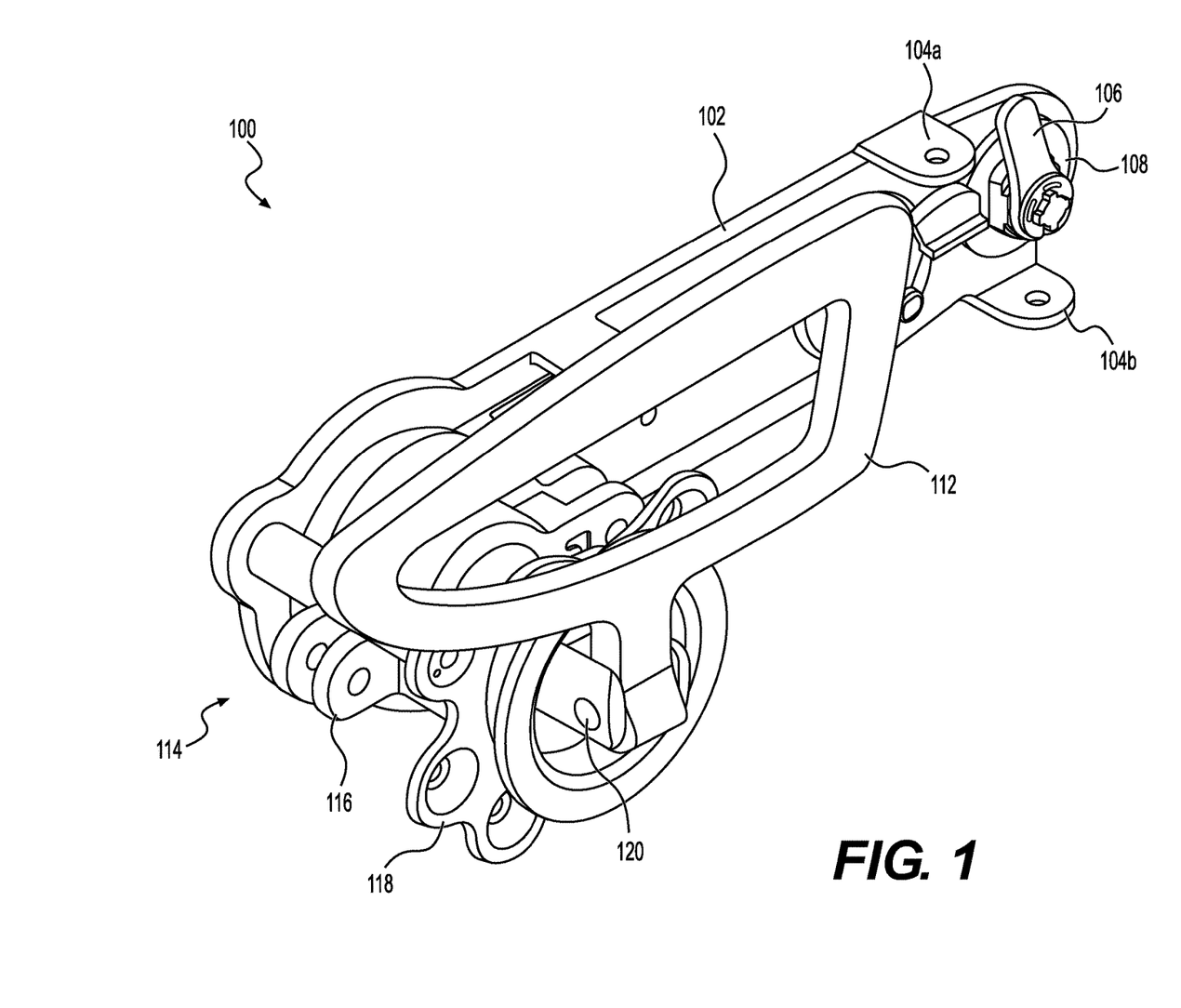
FIG. 1 is an angled, interior view of a locking system for an aircraft door in accordance with the present invention.
Figure 2:
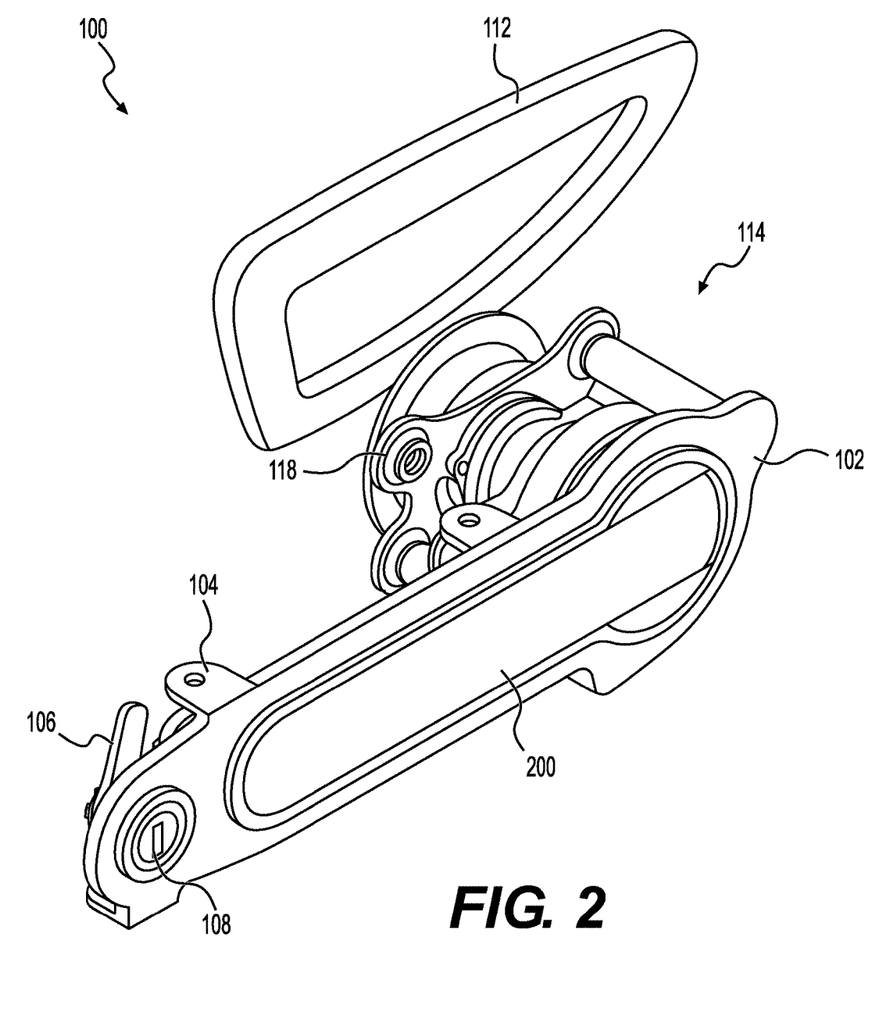
FIG. 2 is an angled, exterior view of the locking system of FIG. 1.

FIGS. 1 and 2 show a locking system 100 for use with an aircraft door that provides independent operation from an interior handle 112 and an exterior handle 200. The locking system 100 includes a door handle housing 102 which mounts to the aircraft door via any means understood by those skilled in the art, such as one or more housing attachment points 104a-b. The door handle housing 102 can structurally vary and provides support for a locking mechanism 114 which extends through the aircraft door and is operated via the interior handle 112 and the exterior handle 200. Those skilled in the art will appreciate that the shape of each of the door handle housing 102, the interior door handle 112, and the exterior door handle 200 may vary based on aesthetic, functional, or manufacturing considerations. The locking mechanism 114, will include, among other components, a door gear axis 116 to attach to latching devices (not shown), wherein the latching devices lock the aircraft door when rotated into one or more latch receivers, as would be understood by those skilled in the art. In other words, as the door gear axis 116 is rotated via either the interior handle 112 or the exterior handle 200, the latching devices will be rotated into locked or unlocked positions. As shown, the interior handle 112 is coupled to the door gear axis 116 via a hinged connection 120. In embodiments, a secondary door handle housing 118 provides for additional structural integrity and securement of the locking system 100 to the aircraft door. The locking system 100 can include a keyed lock 108 with a keyed lock latch 106 to allow a user to lock the aircraft door when not in use, such as for theft prevention.

Figure 3:
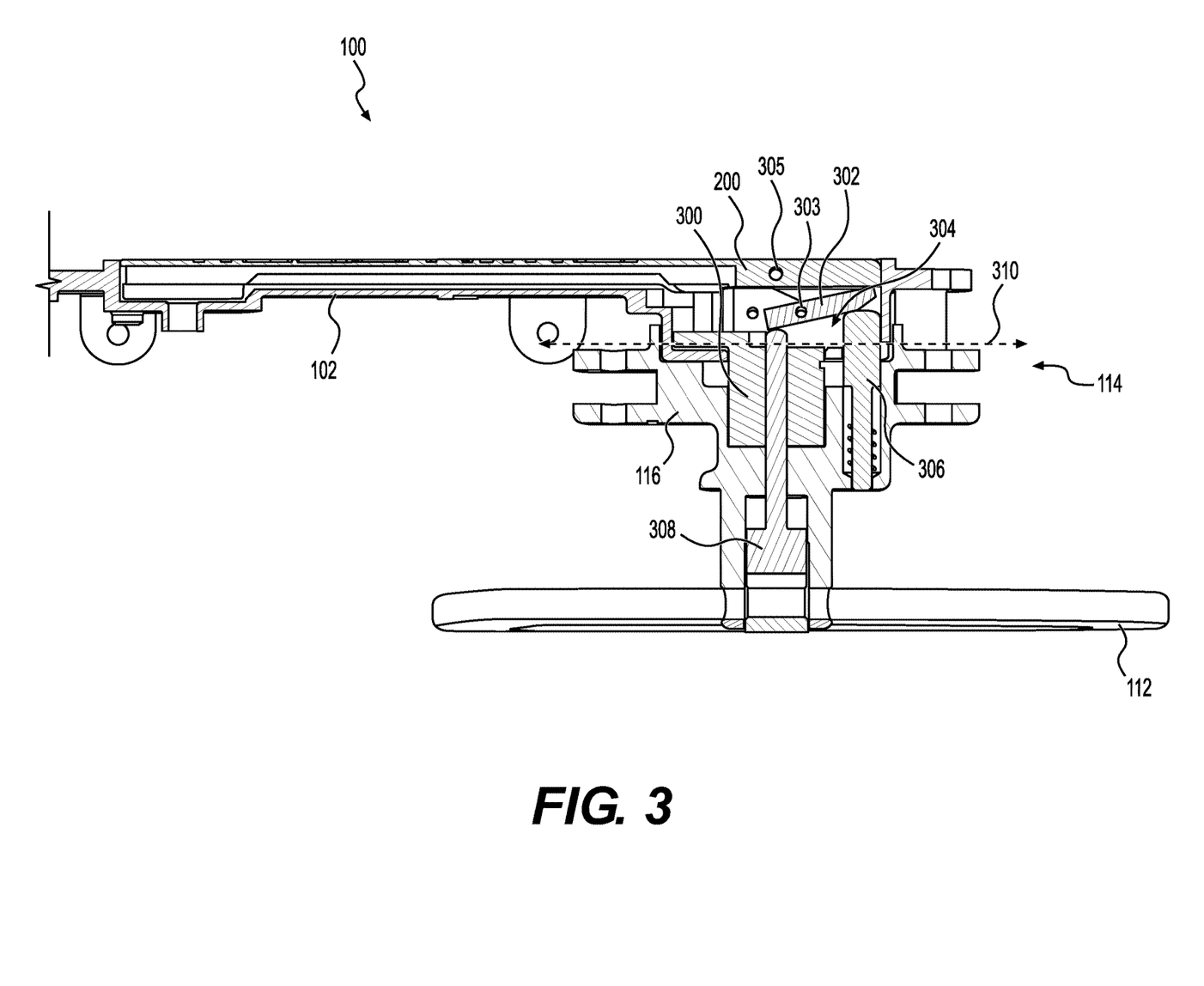
FIG. 3 is top, cross-sectional view of the locking system of FIG. 1 in a locked position.
Figure 4:
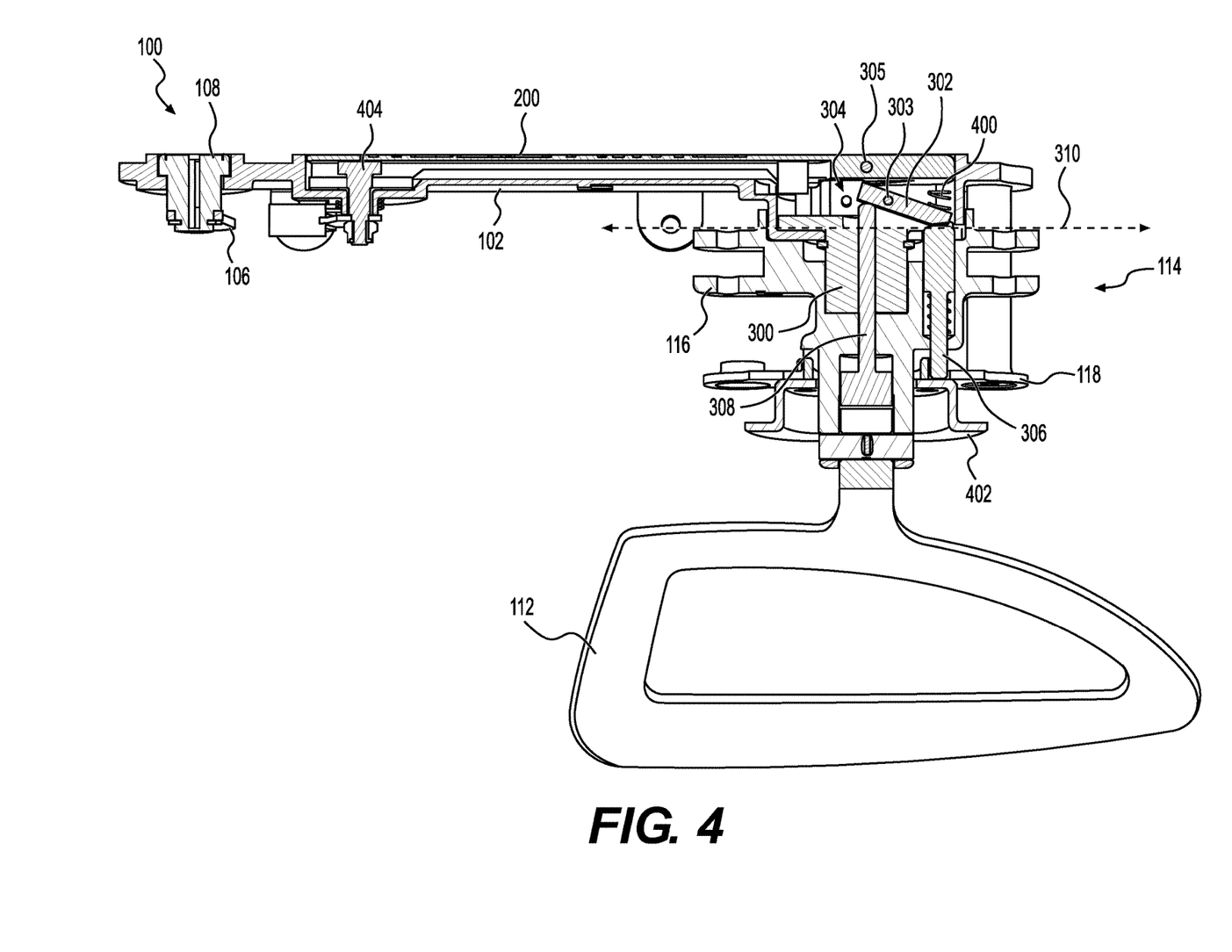
FIG. 4 is a top, cross-sectional view of the locking system of FIG. 1 in an unlocked position due to an interior handle engaging with a locking button to depress a locking pin.
Figure 5:
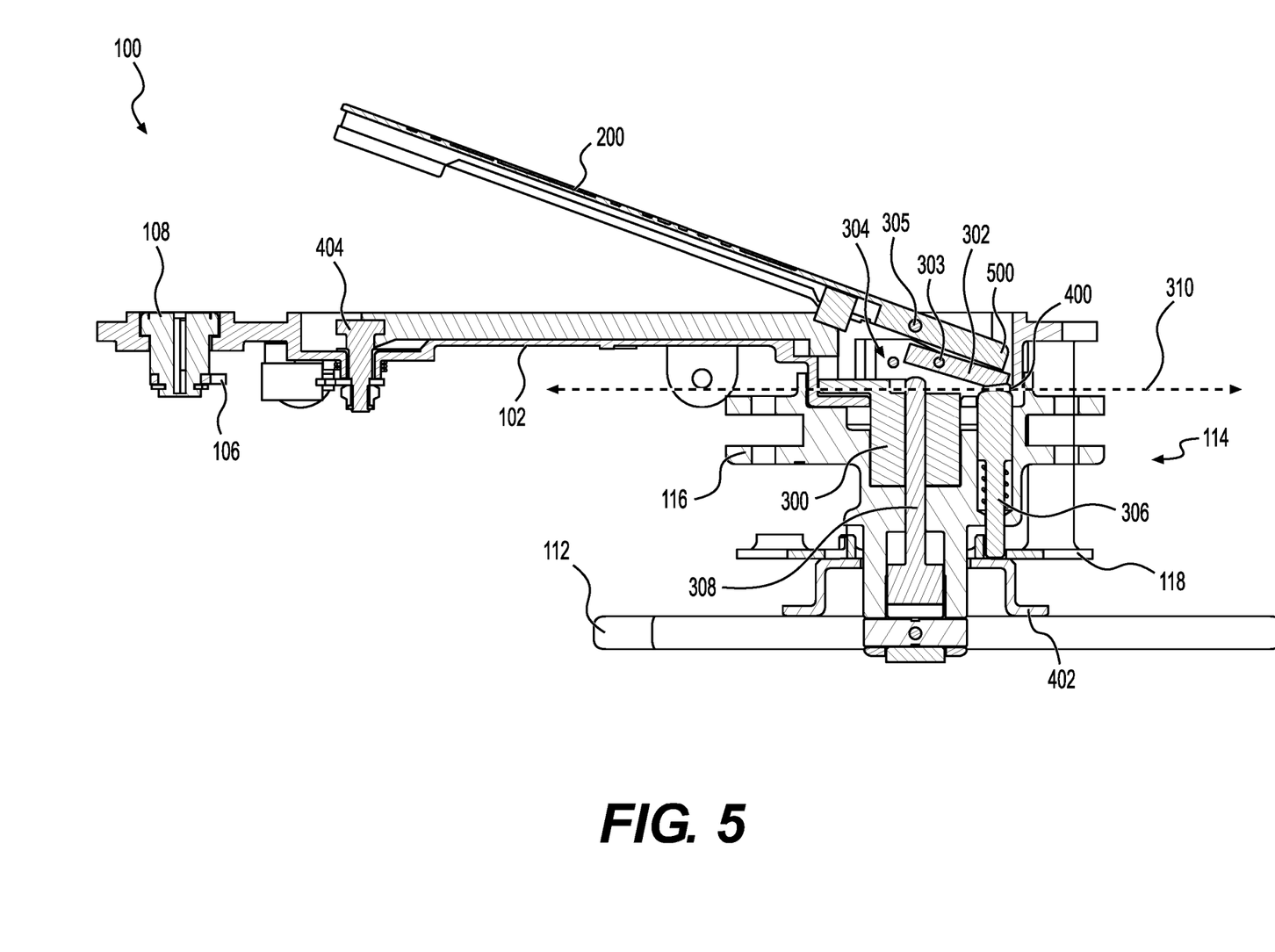
FIG. 5 is a top, cross-sectional view of the locking system of FIG. 1 in an unlocked position due to an exterior handle engaging with the locking button to depress the locking pin.

In FIGS. 3, 4, and 5, the locking system 100 is shown in a locked position, an interior handle activated unlocked position, and an exterior handle activated unlocked position respectively. A locking pin 306, which may be spring loaded via a spring 400, extends into a chamber 304 as part of the door handle housing 102. The locking pin 306 extends through a rotational axis 310 of the locking mechanism 114 when in the locked position (see FIG. 3) such that rotation of the locking mechanism 114 is prevented. Accordingly, in order for the locking system 100 to be operated to open the aircraft door, the locking pin 306 must be pushed out of the chamber 304 to allow rotation (see FIGS. 4 and 5). In embodiments, a handle lock button 302 is positioned within the chamber 304 and secured in place at a pivot point 303. As shown, the handle lock button 302 can pivot about the pivot point 303 such that it allows the locking pin 306 to extend through the rotational axis 310 when in the locked position (see FIG. 3), or alternatively can pivot to depress the locking pin 306 out of the rotational axis 310 when in the unlocked positions (see FIGS. 4 and 5).

The locking system 100 allows for the exterior handle 200 and the interior handle 112 to independently depress the locking pin 306. As shown in FIG. 4, the interior handle 112 is configured to pivot into an engaging position, wherein force applied to the interior handle 112 pushes a door lock pin 308 into the chamber 304 to push against and pivot the handle lock button 302 such that the handle lock button 302 pivots into and depresses the locking pin 306 out of the rotational axis 310. Those skilled in the art will appreciate that the door lock pin 308 extends through a door handle knob 300 and into the chamber 304 such that it does not hinder rotation of the door handle knob 300 or the door gear axis 116 to lock and unlock the aircraft door. During operation, a user will push into the locking mechanism 114 with the interior handle 112 to cause the locking pin 306 to depress, and the user can then freely rotate the handle 112 to rotate the door gear axis 116 and disengage the latching devices (not shown) to open the aircraft door.

As best shown in FIG. 5, the exterior handle 200 is used from an exterior of the aircraft to similarly depress the pin 306 out of the axis of rotation 310, such that the door gear axis 116 can be freely rotated to open the aircraft door. As shown, the exterior handle 200 is disengaged from the door handle housing 102. In embodiments, a spring-loaded lock 404 may be used to retain the exterior handle 200 in a flush position with the door handle housing 102. Accordingly, a user may apply slight inward pressure to release the exterior handle 200 from the spring-loaded lock 404. Those skilled in the art will recognize this as one potential mechanism of retaining the exterior handle 200 in a flush position. Once released, the exterior handle 200 can pivot away from the door handle housing 102 about a pivot point 305 such that an end 500 of the exterior handle 200 applies force to the handle lock button 302 to depress the locking pin 306 out of the axis of rotation 310, such that the door handle knob 300 can be rotated, along with the door gear axis 116, to disengage the latching devices and open the aircraft door. In embodiments, a flanged bushing 402 is positioned around a portion of the door gear axis 116, which may function to provide a stop to locking pin 306, as shown in FIG. 4, and further provide a stop for the interior handle 112, or may hold the handle 112, when not in use, as shown in FIG. 5.

The locking pin 306 ensures that door handle knob 300 and the door gear axis 116 do not rotate or move due to vibrations of the aircraft, but rather the locking mechanism 114 requires intentional operation of either the interior handle 112 or the exterior handle 200 to allow for said rotation and opening of the aircraft door.

Figure 6:
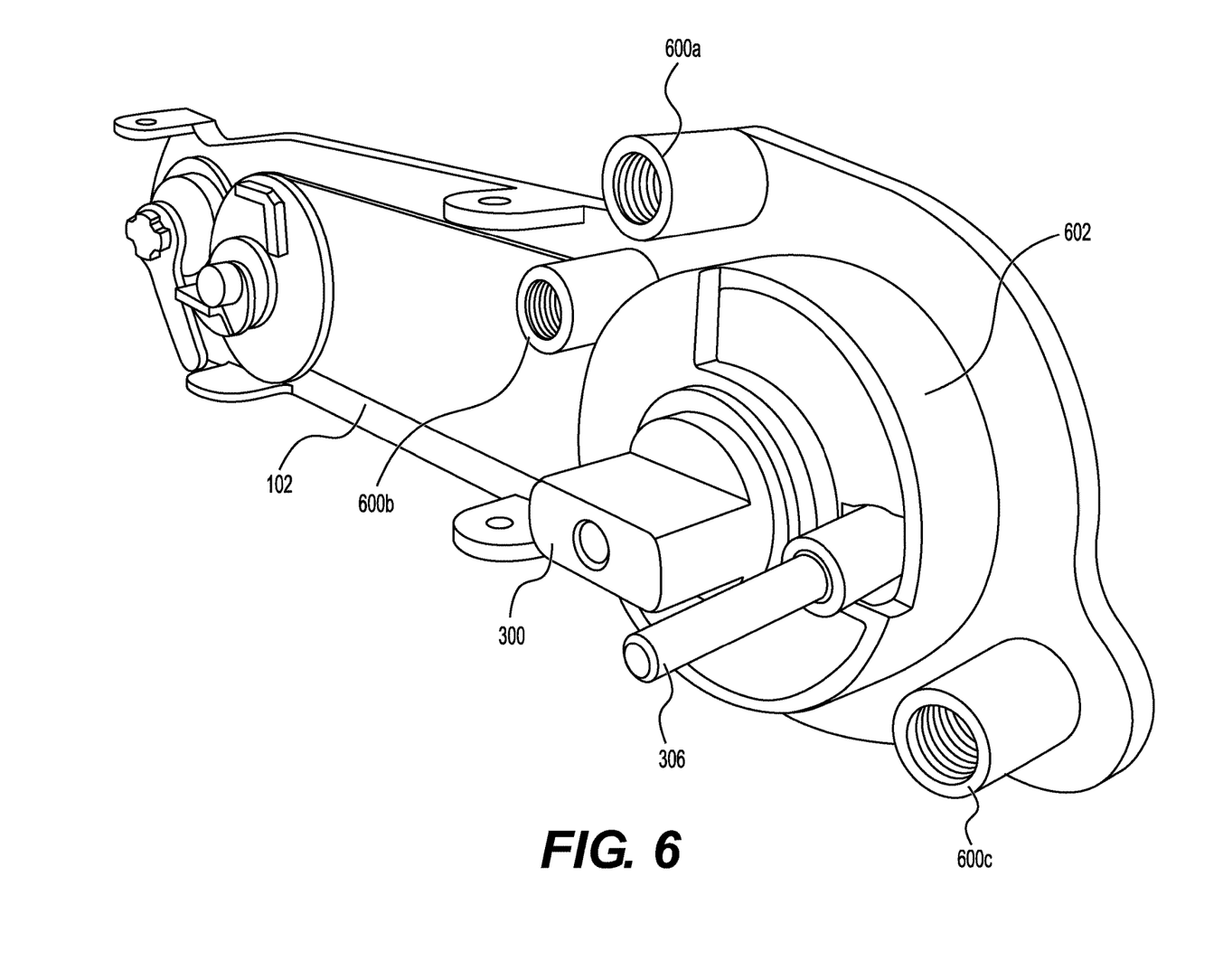
FIG. 6 is an angled view showing the locking pin in a locked position and a door handle knob in a first position as part of the locking system of FIG. 1.
Figure 7:
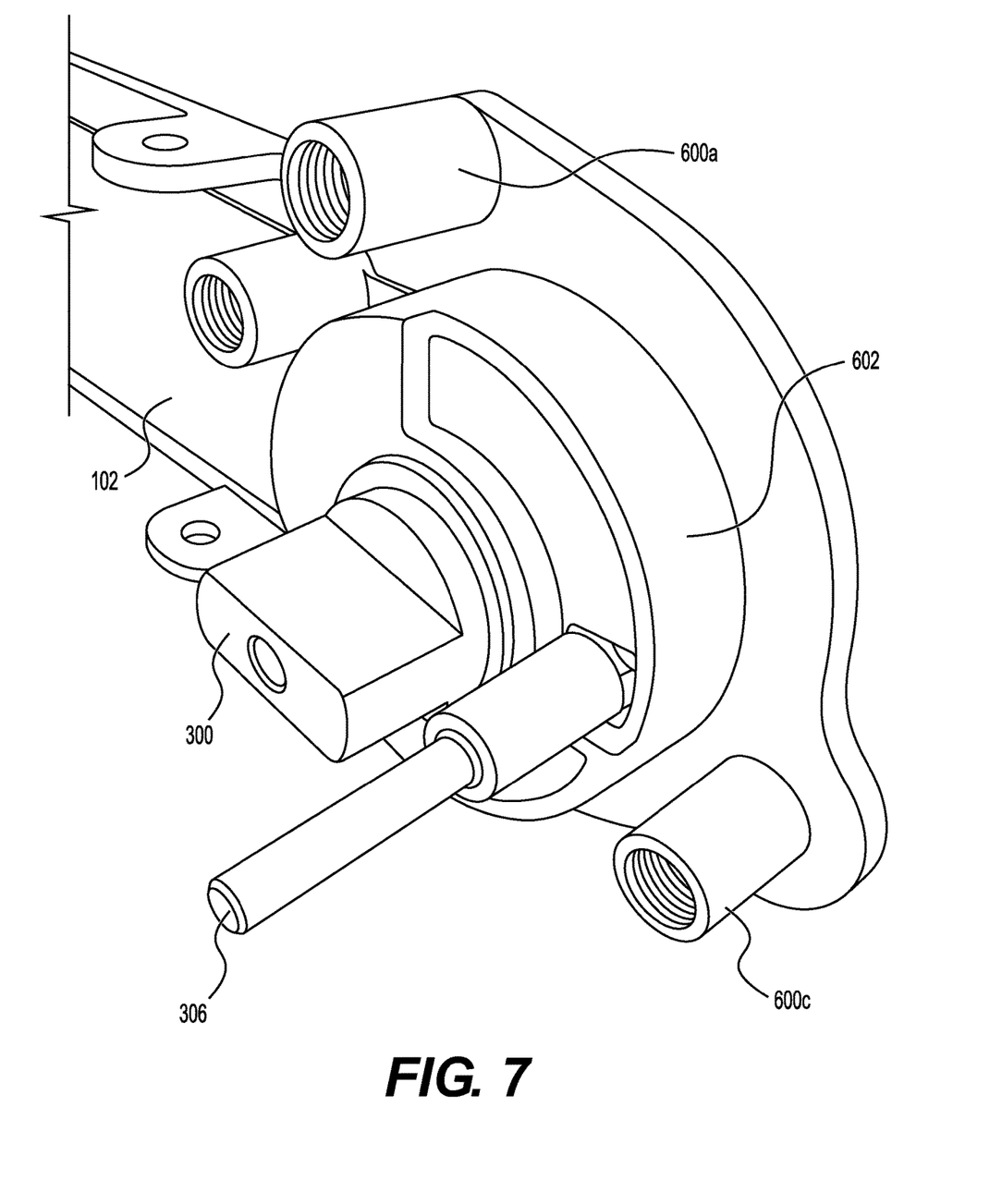
FIG. 7 is an angled view showing the locking pin in an unlocked position and the door handle knob in the first position as part of the locking system of FIG. 1.
Figure 8:
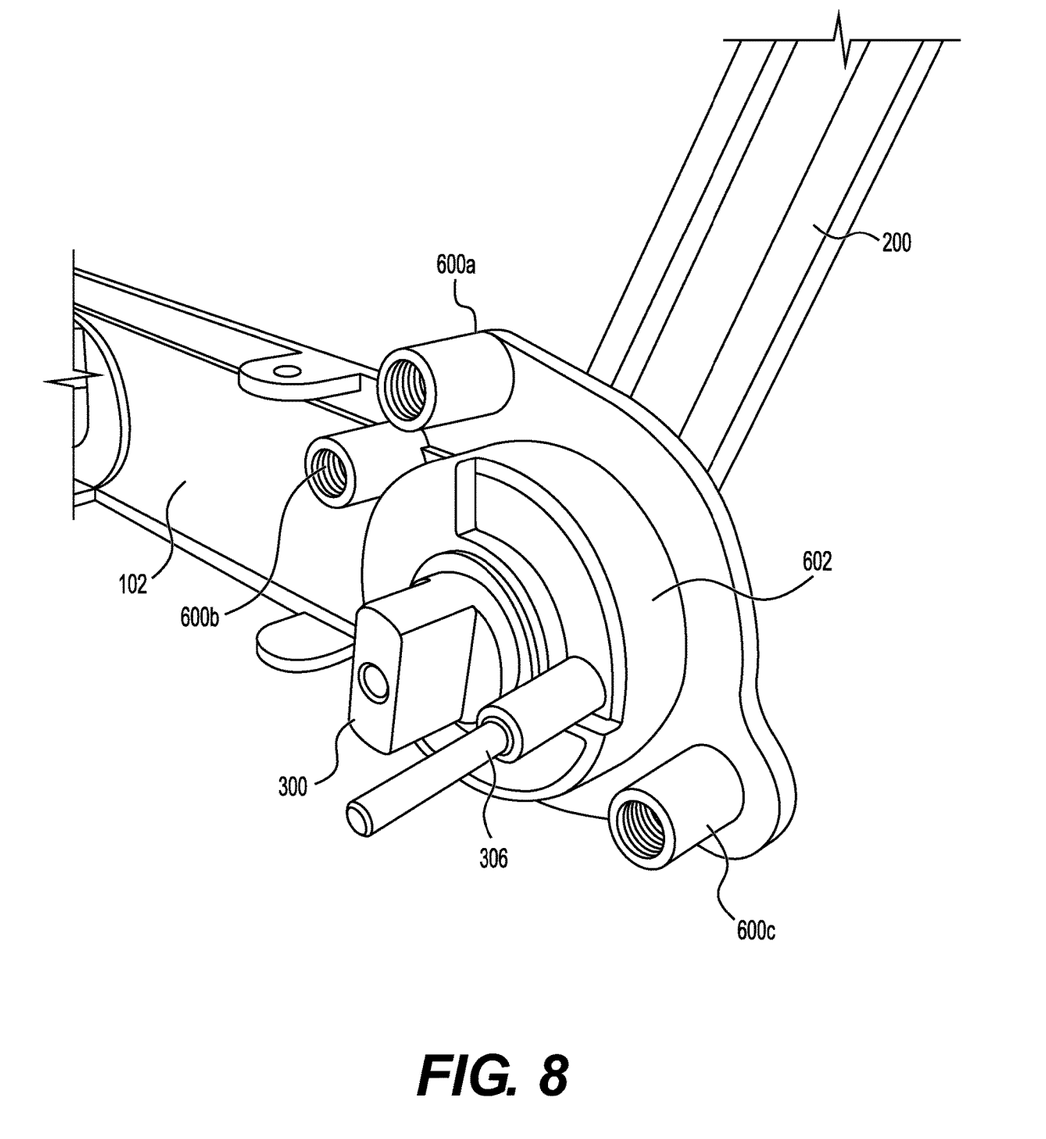
FIG. 8 is an angled view showing the locking pin in the unlocked position and the door handle knob turned to a second position as part of the locking system of FIG. 1.

FIGS. 6 and 7 show the pin 306 in a locked position and an unlocked position respectively. FIG. 8 shows the exterior handle 200 lifted such that the door handle knob 300 is rotated. As shown, the door handle housing 102 can include a plurality of threaded receivers 600a-c for engaging with other structural components, such as the secondary door handle housing 118. In FIG. 6, the locking pin 306 is inserted into the chamber 304 within a chamber housing 602 as part of the door handle housing 102. In FIG. 7, the exterior handle 200 is released and pivoted outward from the door handle housing 102 such that the locking pin 306 is pushed out. In FIG. 8, the exterior handle 200 is rotated upwards such that the door handle knob 300 rotates into a new position. As would be understood by those skilled in the art, as the door handle knob 300 rotates, so does the door gear axis 116 to manipulate the latching devices to allow the aircraft door to open.

Figure 9:
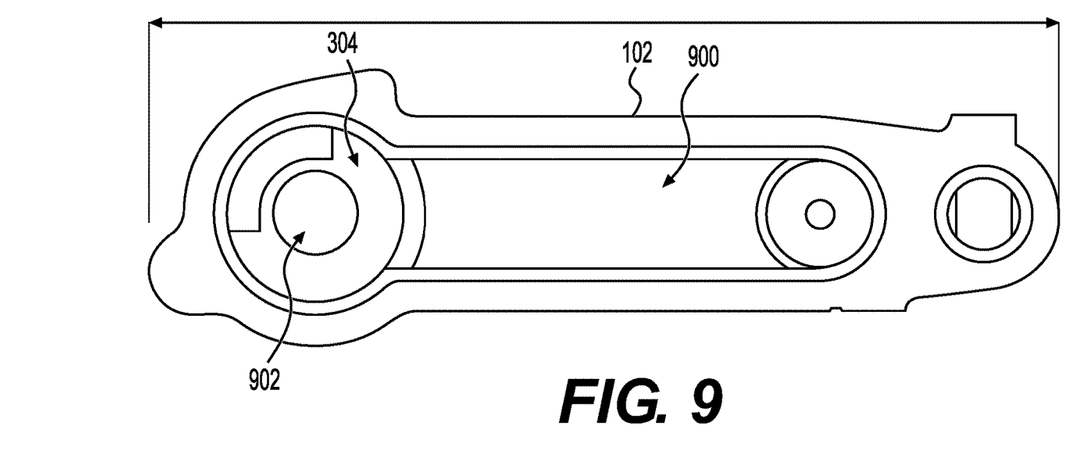
FIG. 9 is a side view of a door handle housing as part of the locking system of FIG. 1.
Figure 10:
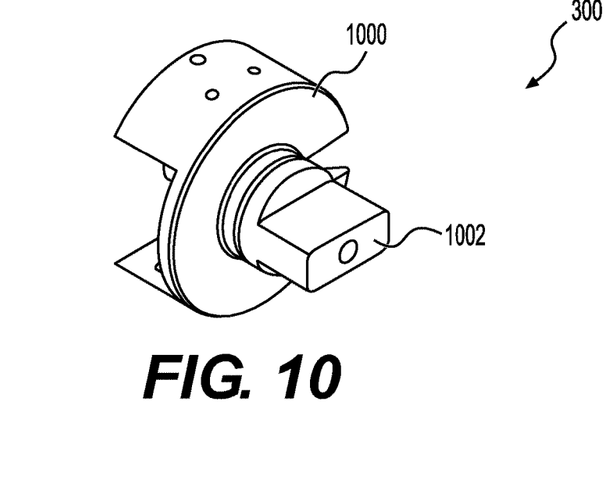
FIG. 10 is an angled view of a door handle knob as part of the locking system of FIG. 1.
Figure 11:
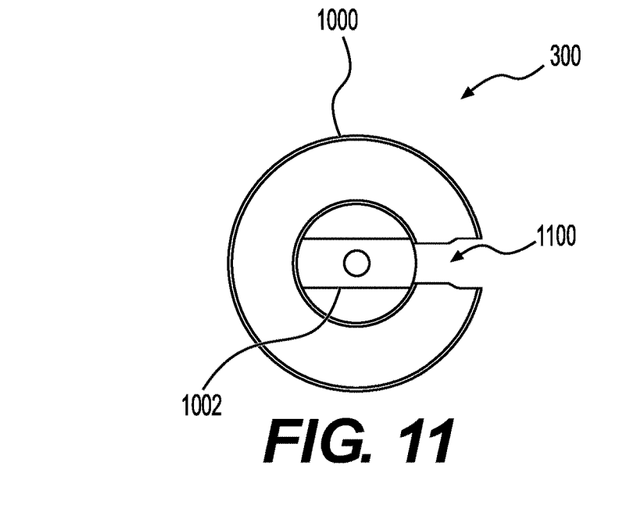
FIG. 11 is an end view of the door handle knob of FIG. 10.

In FIG. 9 the door handle housing 102 is shown for clarity. Those skilled in the art will appreciate that door handle housing 102 may vary, such as in dimensions and aesthetics, without departing from the present invention. The door handle housing 102 includes a recess 900 in which the exterior handle 200 rests when in a closed position. The chamber 304, as previously discussed, is also recessed into the door handle housing 102. An opening 902 provides a location for the door handle knob 300 to extend through. In FIGS. 10 and 11 the door handle knob 300 is shown. A body portion 1000 of the door handle knob 300 is positioned within the chamber 304 of the door handle housing 102 such that a protruding knob 1002 extends through the opening 902. As best shown in FIG. 11, a cutout notch 1100 provides space for the locking pin 306 to extend through and into the chamber 304.

Figure 12:
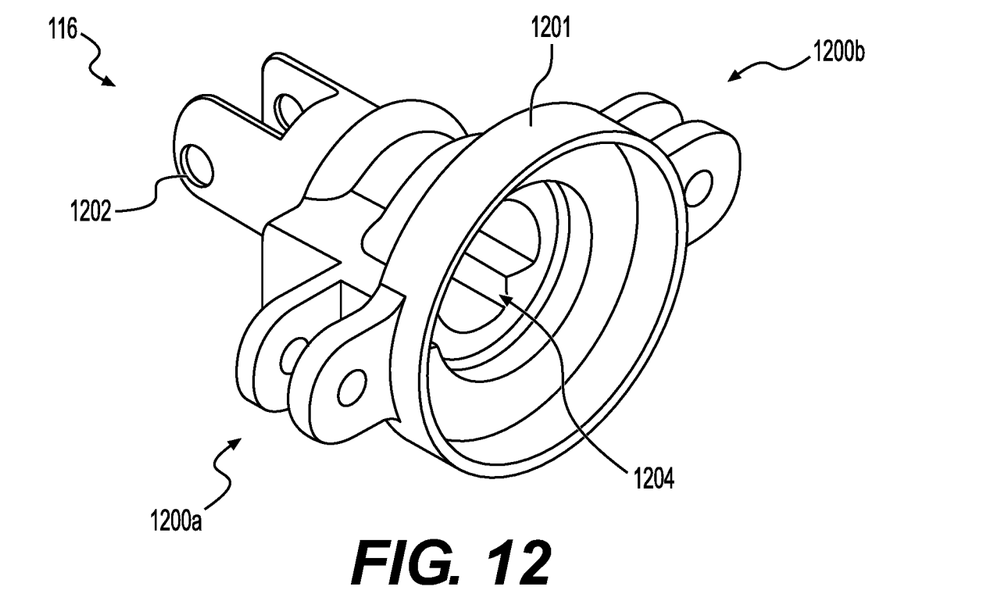
FIG. 12 is an angled view of a door gear axis as part of the locking system of FIG. 1.
Figure 13:
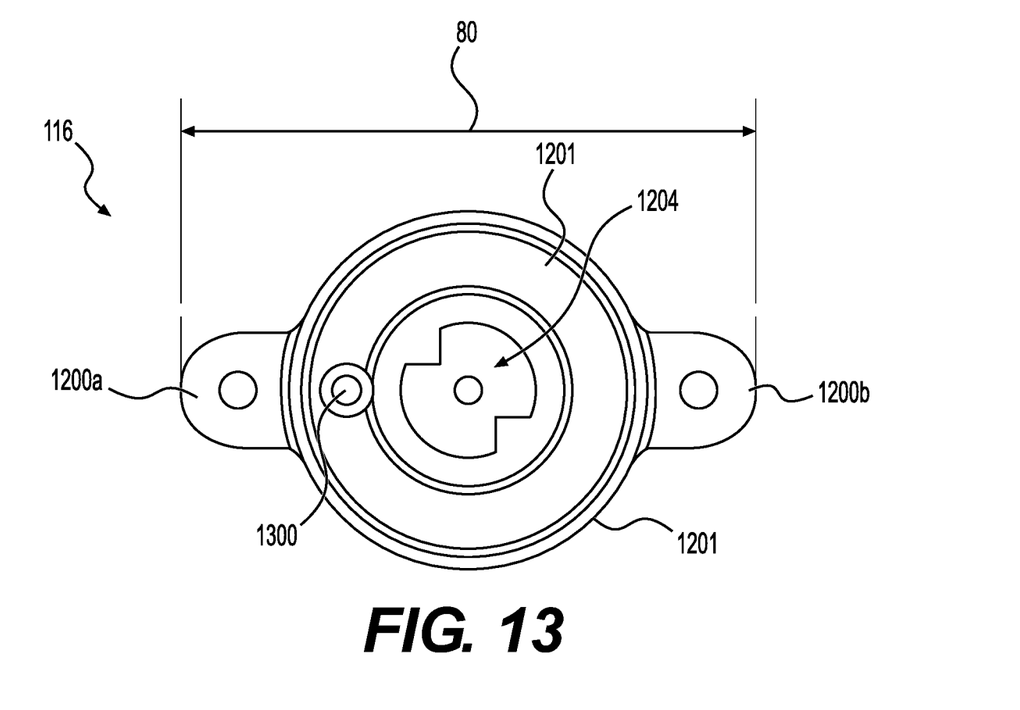
FIG. 13 is an end view of the door gear axis of FIG. 12.

FIGS. 12 and 13 depict the door gear axis 116 for clarity. As shown, the door gear axis 116 includes two connectors 1200a, 1200b extending from a body portion 1201 on opposite sides from one another. The two connectors 1200a, 1200b independently receive and engage with latching devices (not shown). As previously discussed, the door gear axis 116 is rotated via either the interior handle 112 or exterior handle 200, causing rotation of the latching devices. Accordingly, the latching devices either lock the aircraft door closed, or allow for the aircraft door to open. Further shown is a connection 1202 where the interior handle 112 connects to the door gear axis 116 to create the hinged connection 120. A socket 1204 within a central region of the body portion 1201 provides a location for the protruding knob 1002 of the door handle knob 300 to engage such that rotational force is transferred from the protruding knob 1002 to the door gear axis 116. Accordingly, the exterior handle 200 is coupled to the door handle knob 300, which is coupled with the door gear axis 116 via the protruding knob 1002 and the socket 1204, allowing for the exterior handle 200 to operate the door gear axis 116. As best shown in FIG. 13, a channel 1300 extends through the body portion 1201, the channel 1300 provides a location for the locking pin 306 to extend through and into the chamber 304.

Figure 14:
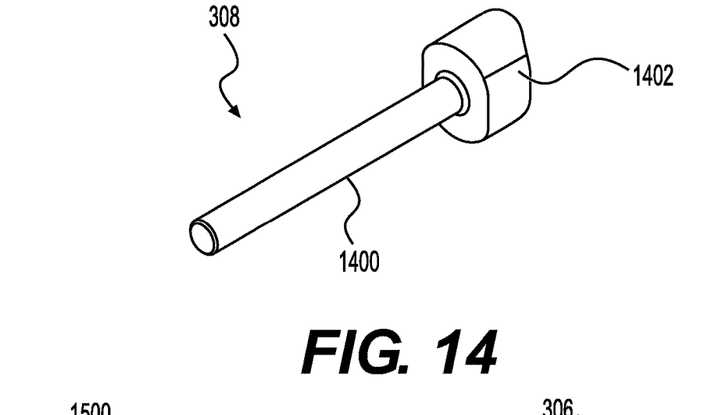
FIG. 14 is an angled view of a door lock pin as part of the locking system of FIG. 1.
Figure 15:
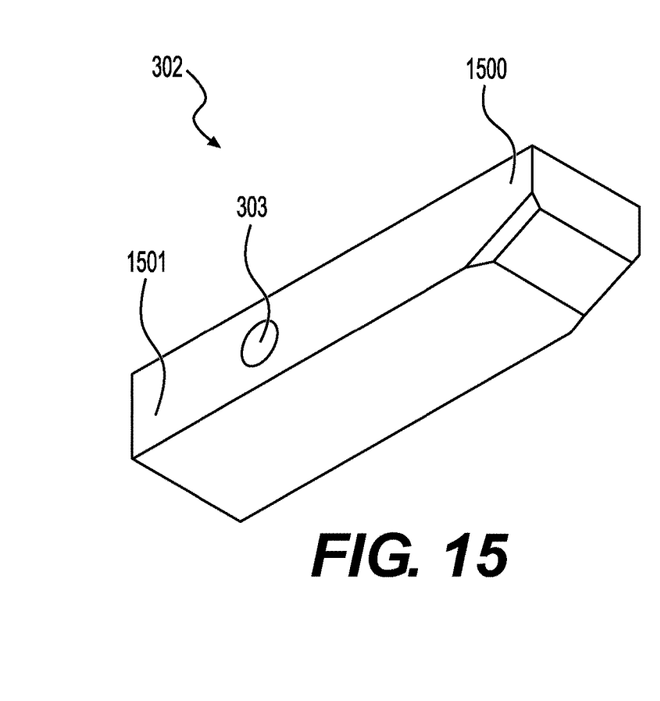
FIG. 15 is an angled view of a handle lock button as part of the locking system of FIG. 1.
Figure 16:
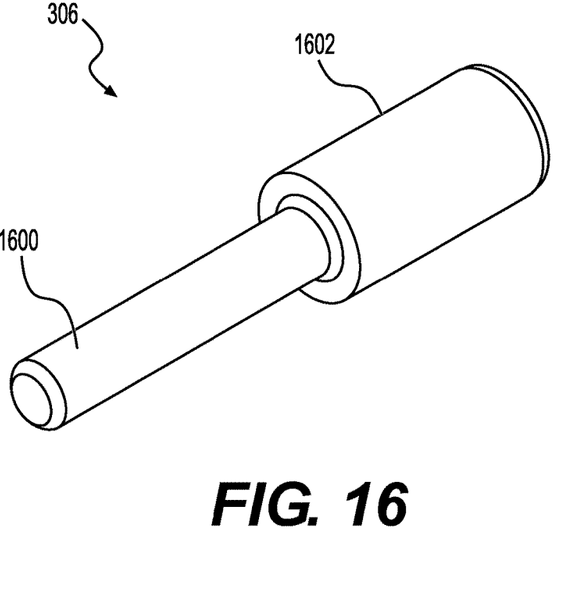
FIG. 16 is an angled view of a locking pin as part of the locking system of FIG. 1.
Figure 17:
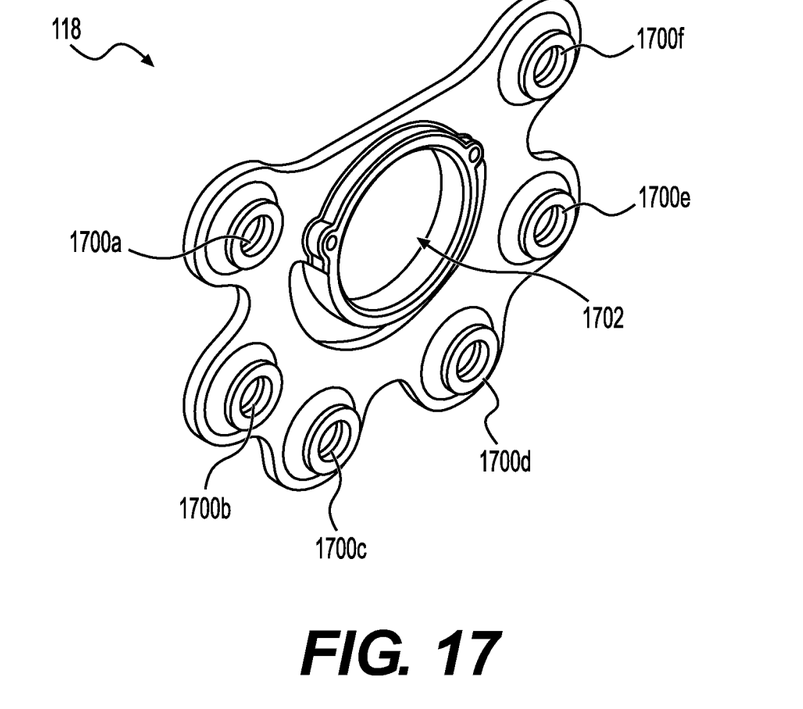
FIG. 17 is an angled view of a secondary door handle housing as part of the locking system of FIG. 1.
Figure 18:
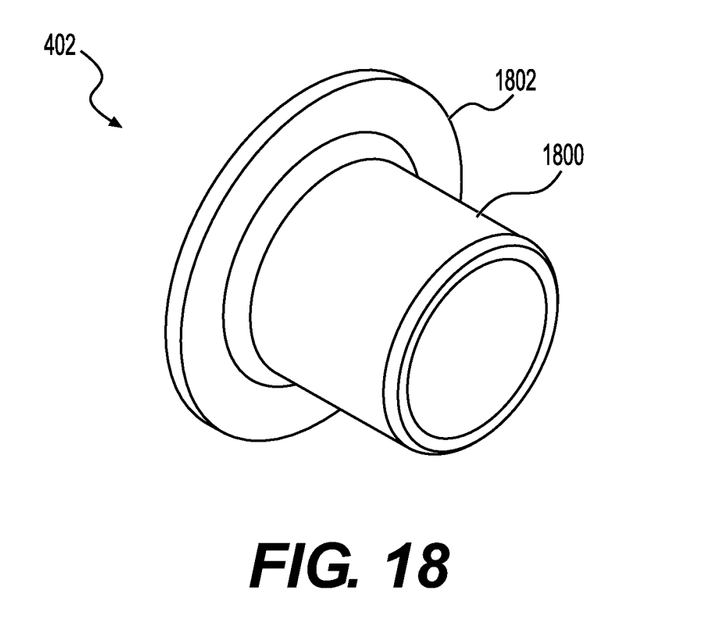
FIG. 18 is an angled view of a flanged bushing as part of the locking system of FIG. 1.

FIG. 14 depicts the door lock pin 308 for clarity, having a pin 1400 extending from a base 1402. FIG. 15 depicts the handle lock button 302 for clarity, having a first end 1500 for pivoting into the locking pin 306 and depressing the locking pin 306 to an unlocked position. A pivot point 303 located between the first end 1500 and a second end 1501 provides a location to secure the handle lock button 302. FIG. 16 depicts the locking pin 306 for clarity. The locking pin 306 may vary, but in embodiments includes a first section 1600 and a second section 1602, the second section 1602 having a greater diameter than the first section 1600 as shown. FIG. 17 depicts the secondary door handle housing 118 with a plurality of attachment locations 1700a-f for securing to the door handle housing 102 and the aircraft door. An opening 1702 allows for the door gear axis 116 to extend therethrough. Lastly, FIG. 18 depicts the flanged bushing 402 for clarify, having a tubular body 1800 and a flange 1802 extending from said tubular body 1800.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A locking system for an aircraft door as part of an aircraft, the locking system comprising:
   a door handle housing configured to mount to the aircraft door;
   a locking mechanism supported by the door handle housing;
   an exterior handle configured to open the aircraft door by manipulating the locking mechanism from an exterior of the aircraft; and
   an interior handle configured to open the aircraft door by manipulating the locking mechanism from an interior of the aircraft;
   the locking mechanism having:
     a door gear axis configured to rotate via operation of the interior handle and the exterior handle to lock and unlock the locking mechanism;

a locking pin extending from the door gear axis and into a chamber as part of the door handle housing, the locking pin having a first position and a second position; and a handle lock button positioned within the chamber created by the door handle housing, the handle lock button configured to pivot about a pivot point such that the handle lock button engages with the locking pin to depress the locking pin to the second position;

wherein in the first position the locking pin blocks rotation of the door gear axis; and wherein in the second position the locking pin allows rotation of the door gear axis;

wherein the locking pin is moveable from the first position to the second position via operation of the interior handle and the exterior handle such that the interior handle and the exterior handle can independently move the locking pin into the second position to operate rotation of the door gear axis.

2. The locking system of claim 1, wherein the locking mechanism further comprises a door handle knob extending through the door handle housing and coupling the exterior handle to the door gear axis.

3. The locking system of claim 1, wherein the interior handle is configured to operate the handle lock button to depress the locking pin.

4. The locking system of claim 3, further comprising a door lock pin moveable via the interior handle and extending at least partially through the door gear axis, wherein moving the door lock pin via the interior handle pivots the handle lock button to depress the locking pin.

5. The locking system of claim 1, wherein the exterior handle is configured to operate the handle lock button to depress the locking pin.

6. The locking system of claim 5, wherein the exterior handle pivots about a pivot point to apply force to the handle lock button to depress the locking pin.

7. The locking system of claim 1, further comprising a keyed lock supported by the door handle housing, the keyed lock having a keyed lock latch for locking the aircraft door in a closed position.

8. The locking system of claim 1, wherein the exterior handle is mounted substantially flush with the door handle housing.

9. The locking system of claim 1, wherein the locking pin is spring loaded.

10. The locking system of claim 1, wherein the interior handle is configured to pivot between a first position and a second position.

11. The locking system of claim 1, further comprising a flanged bushing extending around a portion of the door gear axis.

12. The locking system of claim 11, wherein the flanged bushing provides a stop for the locking pin as the locking pin is depressed into the second position.

13. The locking system of claim 1, wherein the door gear axis comprises:

a body supporting a first connector and a second connector;

a recess for receiving a portion of a door handle knob to couple the door gear axis and the door handle knob together;

a connection for connecting the door gear axis to the interior handle; and a channel extending through the body;

wherein the locking pin is positioned within the channel and extends into the chamber from the channel.

14. A locking mechanism as part of an aircraft door locking system, the locking mechanism comprising:

a housing forming a chamber, the housing being a stationary component of the aircraft door locking mechanism;

a door gear axis coupled to the housing, the door gear axis forming a rotating component of the locking mechanism;

a locking pin extending from the door gear axis and into the chamber, the locking pin having a first position and a second position; and a handle lock button positioned within the chamber created by the housing, the handle lock button configured to pivot about a pivot point such that the handle lock button engages with the locking pin to depress the locking pin to the second position;

wherein in the first position the locking pin blocks rotation of the door gear axis; and wherein in the second position the locking pin allows rotation of the door gear axis.

15. The locking mechanism of claim 14, further comprising a door handle knob extending through the housing and coupling the housing to the door gear axis.

16. The locking mechanism of claim 14, wherein the locking pin is spring loaded.

17. The locking mechanism of claim 14, wherein the door gear axis further comprises:

a body supporting a first connector and a second connector;

a recess for receiving a portion of a door handle knob to couple the door gear axis and the door handle knob together;

a connection for connecting the door gear axis to a handle; and a channel extending through the body;

wherein the locking pin is positioned within the channel and extends into the chamber from the channel.

18. A locking mechanism as part of an aircraft door locking system, the locking mechanism comprising:

a housing forming a chamber, the housing being a stationary component of the aircraft door locking mechanism;

a door gear axis coupled to the housing, the door gear axis forming a rotating component of the locking mechanism;

a locking pin extending from the door gear axis and into the chamber, the locking pin having a first position and a second position; and a handle lock button positioned within the chamber created by the housing, the handle lock button configured to depress the locking pin to the second position;

wherein in the first position the locking pin blocks rotation of the door gear axis; and wherein in the second position the locking pin allows rotation of the door gear axis.

* * * * *